(12) United States Patent  (10) Patent No.: US 6,374,488 B1
McLean et al.  (45) Date of Patent: Apr. 23, 2002

(54) METHOD OF LASER STRIPPING COATED CABLES FOR ENDOCARDIAL DEFIBRILLATION LEADS

(75) Inventors: Arthur G. N. McLean, Lake Jackson; G. Shantanu Reddy, Houston, both of TX (US)

(73) Assignee: Intermedics Inc., Angleton, TX (US)

( * ) Notice: Subject to any disclaimer, the term of this patent is extended or adjusted under 35 U.S.C. 154(b) by 0 days.

(21) Appl. No.: 09/475,570

(22) Filed: Jan. 5, 2000

Related U.S. Application Data

(62) Division of application No. 09/252,420, filed on Feb. 18, 1999.

(51) Int. Cl.[7] .............................................. H02R 43/04
(52) U.S. Cl. ............................. 29/867; 29/825; 29/857; 29/864
(58) Field of Search ........................ 29/825, 857, 872, 29/863, 867

(56) References Cited

U.S. PATENT DOCUMENTS

| | | | |
|---|---|---|---|
| 3,633,096 A | 1/1972 | Bollman | 324/51 |
| 3,636,623 A | 1/1972 | Paine et al. | |
| 3,946,768 A | 3/1976 | Fiorentino | 140/92.1 |
| 3,953,706 A | 4/1976 | Harris et al. | 219/121 |
| 4,191,442 A | 3/1980 | Caveney et al. | |
| 4,454,651 A | 6/1984 | Caveney et al. | 29/861 |
| 4,671,848 A | 6/1987 | Miller et al. | 156/643 |
| 4,711,025 A | 12/1987 | DeSanto | 29/854 |
| 4,724,612 A | 2/1988 | Pearson | 29/850 |
| 4,761,535 A | 8/1988 | Lawson | 219/121.68 |
| 4,867,207 A | 9/1989 | Crawford | 140/92.1 |
| 4,931,616 A | 6/1990 | Usui et al. | 219/121.68 |
| 4,970,367 A | 11/1990 | Miller | 219/121.68 |
| 4,999,472 A | 3/1991 | Neinast et al. | 219/56.22 |
| 5,205,329 A | 4/1993 | Suzuki et al. | 140/92.1 |
| 5,321,227 A * | 6/1994 | Fuchs et al. | 219/121.68 |
| 5,337,941 A | 8/1994 | Higashiura et al. | 228/205 |
| 5,345,978 A | 9/1994 | Okafuji et al. | 140/92.1 |
| 5,390,710 A | 2/1995 | Kato et al. | 140/92.1 |
| 5,521,352 A | 5/1996 | Lawson | 219/121.67 |
| 5,522,130 A * | 6/1996 | Wollerman | 29/825 |
| 5,522,436 A | 6/1996 | Tabuchi et al. | 140/92.1 |
| 5,535,511 A | 7/1996 | Karasik | 29/872 |
| 5,535,788 A | 7/1996 | Mori et al. | 140/92.1 |
| 5,604,976 A | 2/1997 | Stobie et al. | 29/825 |
| 5,829,129 A | 11/1998 | Ito | 29/857 |
| 5,837,961 A | 11/1998 | Miller | 219/121.68 |
| 5,900,587 A | 5/1999 | Piper et al. | 174/117 |
| 5,935,465 A | 8/1999 | Cardineau et al. | 219/121 |

FOREIGN PATENT DOCUMENTS

GB  2246482  1/1992  ........... H01B/13/00

* cited by examiner

*Primary Examiner*—Carl J. Arbes
(74) *Attorney, Agent, or Firm*—Schwegman, Lundberg, Woessner & Kluth, P.A.

(57) ABSTRACT

An apparatus and method for laser stripping coated cables for endocardial defibrillation leads comprising a jig for holding at least one insulated wire, the jig having a base plate, a linear stripping area on the plate, a first clasp mounted on the plate for holding a first end of the wire, at least two primary pins mounted on the plate on a first side of the linear stripping area, at least one secondary pin mounted on the plate on a second side of the linear stripping area, and a second clasp mounted on the plate for holding a second end of the wire; and a laser effective to remove insulation from the insulated wire, the laser being mounted to effectively remove insulation in the linear stripping area.

14 Claims, 6 Drawing Sheets

METHOD OF LASER STRIPPING COATED CABLES FOR ENDOCARDIAL DEFIBRILLATION LEADS

This application is a Division of U.S. application Ser. No. 09/252,420 filed Feb. 18, 1999, pending.

BACKGROUND OF THE INVENTION

1. Field of the Invention

The present invention relates generally to implantable cardiac defibrillation leads, and more particularly to a defibrillation lead having a coated cable conductor therein and to a method of manufacturing for such leads. An apparatus for manufacturing cables by selective laser removal of insulation is described.

2. Description of the Related Art

Implantable medical devices for treating irregular contractions of the heart with electrical stimuli are well known in the art. Some of the most common forms of such implantable devices are defibrillators and pacemakers.

Defibillators are implantable medical devices used to treat fibrillation, a condition characterized by rapid, chaotic electrical and mechanical activity of the heart's excitable myocardial tissue that results in an instantaneous cessation of blood flow from the heart. Defibrillation is a technique employed to terminate fibrillation by applying one or more high energy electrical pulses to the heart in an effort to overwhelm the chaotic contractions of individual tissue sections and to restore the normal synchronized contraction of the total mass of tissue.

A pacemaker, or pacer, is an implantable medical device that delivers low energy electrical pulses to stimulate a patients heart to beat at a desired rate in instances where the heart itself is incapable of proper self-regulation. This occurs when the heart's natural pacemaker, which causes the rhythmic electrical excitation of the heart and pumping of blood, malfunctions due to age or disease. Demand pacing is a process used to maintain normal beating of a heart having this condition.

Various types of leads for defibrillators and demand pacers have been suggested in the prior art. For example, large electrical patches sewn to the exterior surface of the heart have been used to deliver defibrillation pulses to the heart. Implantation of such patch electrodes requires opening of the patient's chest during thoracic surgery. For pacing, pulses may be applied to the heart with the use of a pacer lead having an exposed metal surface, or demand pacer electrode, extending through a vein and into the heart.

Those involved in the medical arts recognized that prior art defibrillators required a high threshold level of energy for effective defibrillation, which limited the useful life-span of the devices and, more significantly, posed a significant risk of causing electrolysis of the blood and myocardial damage. It was realized that the defibrillation electrode configuration played an important role in the amount of energy needed to achieve successful defibrillation. This led to the development of transvenous defibrillation leads having long coil-shaped defibrillation electrodes for implantation into the right ventricle of the heart through a vein. For example, U.S. Pat. No. 4,922,927, the entire disclosure of which is incorporated herein by reference, discloses a defibrillation electrode made up of a plurality of separate wires wound side-by-side to form a tight coil. The coil was disposed upon an insulated tubular member and had a length sufficient to extend throughout the entire length of the ventricular chamber to provide sufficient electrode surface area for defibrillation.

Transvenous cardiac stimulation leads, such as the device of U.S. Pat. No. 4,922,927, were configured to also carry a demand pacing electrode. Thus, a single device implantable in one surgical procedure could provide defibrillation and pacing pulses for heart patients suffering from both irregular heart beat and, at times, cardiac fibrillation. This eliminated the need for multiple and complex surgical procedures to attach the prior art electrodes required for both types of treatments.

Another defibrillation electrode configuration for use with dual purpose transvenous leads is disclosed in U.S. Pat. Nos. 5,476,502 and 5,374,287 to Rubin, which are also incorporated herein by reference in their entireties. The "Rubin" catheter included either a helical or lance shaped defibrillation electrode for delivering a defibrillation pulse directly to the interior of the septum of the patient's heart. The length of the helix-shaped electrode to be screwed into the septum from the right ventricle, about 0.5 cm to 1.0 cm, was substantially shorter than the conventional coiled transvenous defibrillation electrodes.

Despite these developments there continues to be a need for a lead capable of providing both high voltage defibrillation and effective demand pacing with a smaller lead diameter to minimize obstruction in the veins leading to the heart. One such lead has been developed by some of the inventors herein and others. A commonly-assigned patent application has been filed entitled Endocardial Defibrillation Lead with Looped Cable Conductors, attorney docket no. ITM-609 US, the disclosure of which is incorporated herein by reference. This lead has a looped cable conductor for conducting high voltage defibrillating shocks to the heart and a coil conductor for conducting low voltage pacing pulses. These two conductors are carried in separate lumens within a lead body. Additional lumens may be provided for additional conductors if additional functions are desired. The looped cable conductor has insulation which must be accurately removed at selected locations.

SUMMARY OF THE INVENTION

We have invented a method of manufacturing an implantable defibrillation lead with an elongated, flexible lead body having folded cable conductors and an apparatus for performing this method. According to our invention, a jig supports an insulated cable conductor in a looped configuration, exposing selected portions of the conductor over a linear stripping area. A laser selectively removes insulation from the cable. The cable is then folded into a doubled configuration and inserted into a lead body of an endocardial lead.

In a preferred embodiment, there is provided an implantable endocardial defibrillation lead having a looped cable conductor for conducting at least high voltage defibrillation shocks. A coil electrode is connected to an elongated, flexible, electrically non-conductive lead body and is supplied with electrical power for delivering electrical shocks to the heart through a looped cable conductor that extends through the lead body and is associated with a power source.

Depending upon the desired application for the lead, the invention may also be used with a pacer and, thus, include any of a variety of pacer electrodes and sensors that are presently available or may become available. Such devices, if used, would be disposed upon the lead, insulated from the defibrillator electrode segments and electrically connected with a second electrical conductor that extends through the lead body and provides electrical power to the pacer electrode. The lead may also include a ground electrode disposed upon the lead a distance from the other electrodes to receive the pulses delivered to the heart tissue and transmit them back through a third electrical conductor extending through the lead. The coil electrode and looped cable conductor may also serve a dual function as a ground electrode and conductor.

The invention may also be adapted for fixation of the distal end of the lead to the heart to achieve selective positioning of the electrode or electrodes. A variety of currently available passive and active fixation mechanisms, or that may become available, may be used with the invention, such as tines or a fixation screw for securing the distal end of the lead within the heart.

Moreover, multiple coil defibrillation electrodes may be used, for example, for placement in the ventricle and in the superior vena cava of a patient. The defibrillation electrode may be energized through a single cable conductor, in which case insulation must be removed from more than one area of the conductor. Furthermore, if the defibrillation coil or coils are used both for defibrillation an as an anode for cardiac pacing, low and high voltage connections to the cardiac stimulator are usually provided. This would require multiple areas without insulation at the proximal end of the lead as well. Our method and apparatus accurately prepares a cable conductor for use in a defibrillation lead.

The apparatus of our invention comprises a jig for holding at least one insulated wire, the jig having a base plate, a linear stripping area on the plate, a first clasp mounted on the plate for holding a first end of the wire, at least two primary pins mounted on the plate on a first side of the linear stripping area, at least one secondary pin mounted on the plate on a second side of the linear stripping area, and a second clasp mounted on the plate for holding a second end of the wire; and a laser effective to remove insulation from the insulated wire, the laser being mounted to effectively remove insulation in the linear stripping area.

The characteristics and advantages of the present invention described above, as well as additional features and benefits, will be readily apparent to those skilled in the art upon reading the following detailed description and referring to the accompanying drawings.

BRIEF DESCRIPTION OF THE DRAWINGS

For a detailed description of the preferred embodiments of the invention, reference will now be made to the accompanying drawings wherein.

DETAILED DESCRIPTION OF THE PREFERRED EMBODIMENTS

Figure 1:
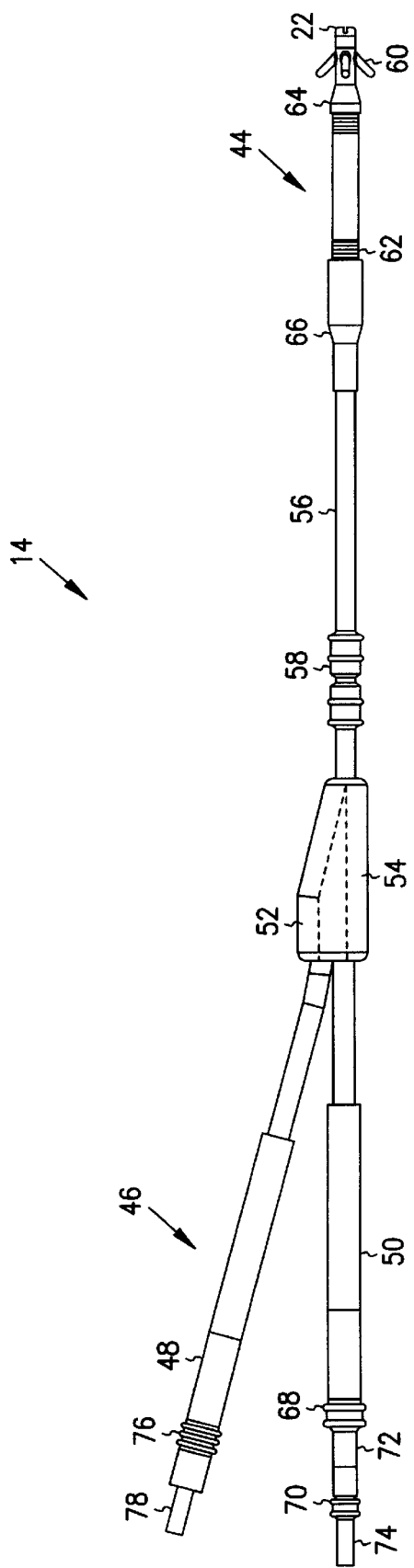
FIG. 1 is a plan view of an implantable defibrillation and pacing lead.

The presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic form in the interest of clarity and conciseness.

FIG. 1 illustrates a plan view of an endocardial high voltage cable lead 14. A ventricular tip cathode or electrode 22 and shock coil 24 are located at distal end 44 of the lead 14. At a proximal end 46 of the lead there is a high voltage connector 48 and a low voltage connector 50, preferably an IS-1 (international standard one) connector. The two connectors 48, 50 are joined at a junction 52 which is covered by an insulative boot 54. A lead body 56 extends between the distal end 44 and the proximal end 46. A suture sleeve 58 is slidingly received on the lead body 56 and conventionally provides additional support for the lead 14 where it is inserted in a blood vessel of a patient. At the tip cathode 22, tines 60 may be provided to help secure the lead 14 within the heart. Other well known active or passive fixation devices, such as helical screws, may be provided. Such features are well known in the art and need not be further described herein.

The shock coil 24 comprises a segment 62 of coiled wire, preferably multi-filar, more preferably tri-filar. A distal cap 64 secures one end of the segment 62, while a proximal sleeve 66 secures the other end. More detail concerning the shock coil 24 will be provided hereafter.

Regarding the proximal end 46 of the lead 14, the low voltage connector 50 is provided with annular sealing rings 68, 70 to prevent body fluids from injuring the connector, when the connector is inserted into the implantable device. Between the sealing rings 68, 70, a lead connector 72 may be provided. A pin connector 74 is located at the proximal end of the lead, thus providing two electrical contacts for the low voltage connector 50. Through these connectors 72, 74, the electrical condition of the heart may be sensed, particularly of the ventricle, if the distal end of the lead 14 is implanted therein. In addition, pacing pulses and other low voltage therapy may be provided through these connectors to the tip cathode 22. As will be more fully explained below, the shock coil 24 may be used as a low voltage anode or indifferent electrode if bipolar sensing or pacing is desired. Attentively, a conventional low voltage ring electrode could be provided near the distal end of the lead.

The high voltage connector 48 also has annular sealing rings 76, but is usually provided only with a pin connector 78. The electrical path for high voltage shocks is usually between this pin connector 78 through an electrical conductor to the shock coil 24 and back through the heart to a can of the implantable medical device (not shown). However, an additional coiled electrode could be provided, forming a bipolar shock electrode. Where two coiled shock electrodes are used, they are frequently placed on the lead such that one would be in the ventricle and the other in the atrium or superior vena cava. Multi-filar coiled connectors have heretofore been used to conduct the electrical current for the shock to one or more shock coils.

Figure 2:
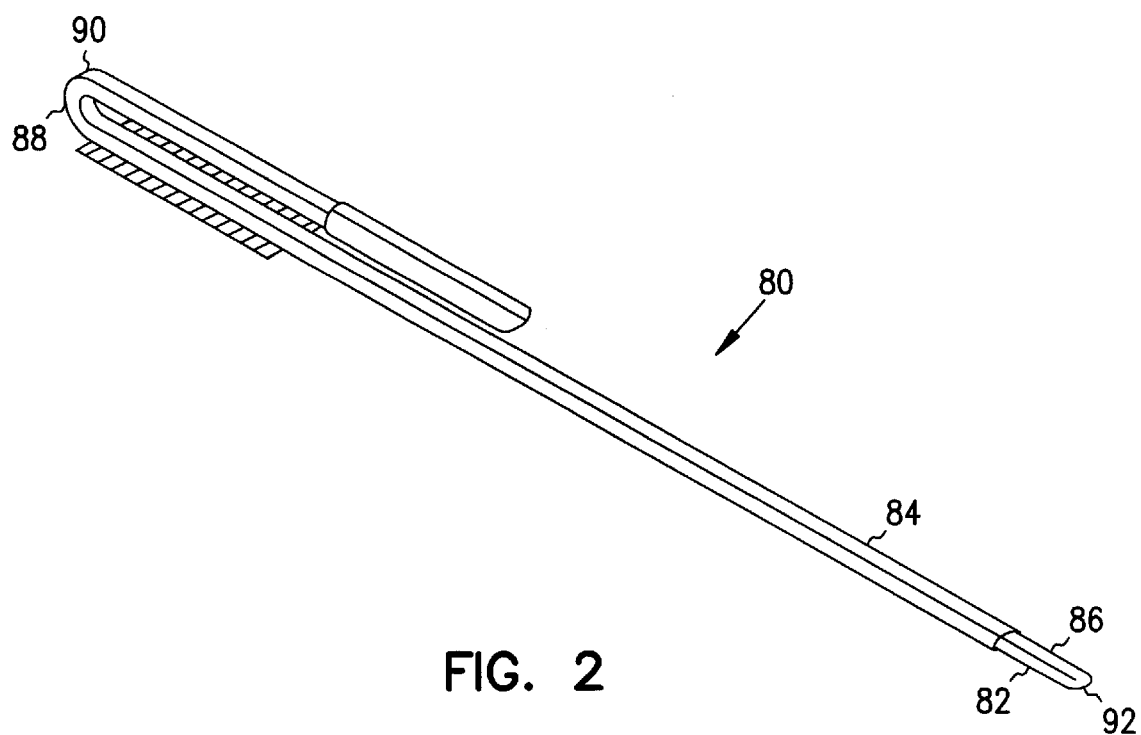
FIG. 2 is a perspective view of a cable conductor used in the lead.

In a preferred embodiment, a looped cable conductor is provided. The cable conductor 80 is illustrated in prospective view in FIG. 2. The cable conductor 80 comprises a conductive multi-strand wire 82. Preferably, most of the wire 82 has insulation 84. A middle section of the wire 86 is stripped of insulation, and then the cable conductor is folded back on itself, forming a loop or bend 92 at the middle section 86. Each end 88, 90, of the conductor is also stripped of insulation. As a consequence of the looped construction described, the conductor 80 forms a redundant system, as either side of the conductor is capable of carrying current to the shock coil 24. If additional electrodes are wanted, additional locations on the wire 82 may be stripped of insulation. The exposed areas must be accurately placed so that two exposed areas come together when the wire 82 is folded.

Figure 3:
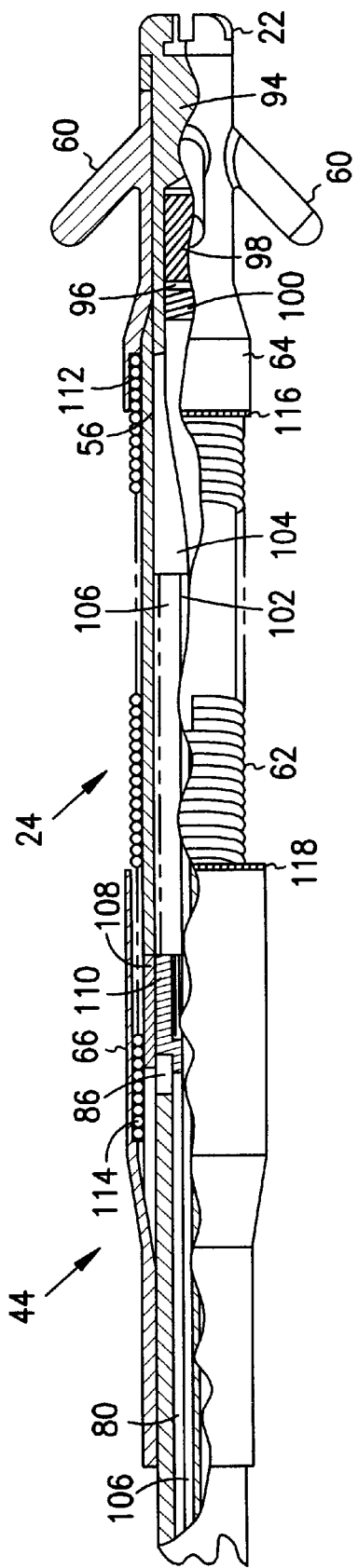
FIG. 3 is a partial section of a distal end of the lead of FIG. 1 with a window for allowing connection of a cable conductor to a defibrillation electrode.

We will describe the distal end 44 of the lead 14 in greater detail, in connection with FIG. 3. FIG. 3 is a partial through-section of the distal end 44. As can be seen in FIG. 3, the tip cathode 22 comprises a shank 94 which extends into the distal cap 64, and into the lead body 56. The tines 60 are formed on the distal cap 64. In addition, the distal cap 64 captures a distal end 112 of the coil segment 62. Within the shank 94, a stopped bore 96 receives a crimp plug 98 and a coil conductor 100. The coil conductor 100 is a conventional low voltage conductor which extends from the tip cathode 22 to the pin connector 74 and electrically couples the cathode 22 and the pin connector 74. The shank 94 is crimped over the crimp plug 98 to secure the conductor 100 between the crimp plug and the shank.

The coil conductor 100 passes through a first lumen 102 in the lead body 56. Preferably this lumen is non-coaxial, that is, it is offset from the axis of the lead body 56. However, to receive the shank 94 symmetrically with respect to the lead body, a stopped bore 104 is provided in the distal end of the lead body. This stopped bore is coaxial with the axis of the lead body itself. A second lumen 106 is provided to receive the looped cable conductor 80. Preferably, this lumen is also non-coaxial with respect to the lead body and may be smaller in diameter than the first lumen 102. Additional lumens may be provided where additional looped cables are connected to other electrodes, such as a second shock electrode.

A window 108 cuts through a portion of the lead body 56 to expose the second lumen 106. An arcuate crimp sleeve 110 fills this window 108 and captures the stripped middle section 86 of the cable conductor 80. A proximal end 114 of the coil segment 62 extends over the arcuate crimp sleeve 110 and is covered by the proximal sleeve 66. This proximal end 114 preferably extends for a plurality of loops proximal to the arcuate crimp sleeve. In multi-filar coils, each filer should form the loops proximal to the arcuate crimp sleeve. This extension proximal to the crimp sleeve relieves mechanical stresses, and reduces the possibility of a mechanical failure adjacent the crimp sleeve. A circumferential bead of adhesive 116 seals the distal cap 64 to the coil segment 62 and underlying lead body 56. A similar adhesive bead 118 likewise seals the proximal sleeve 66 to the coil segment 62 and lead body 56.

Figure 4:
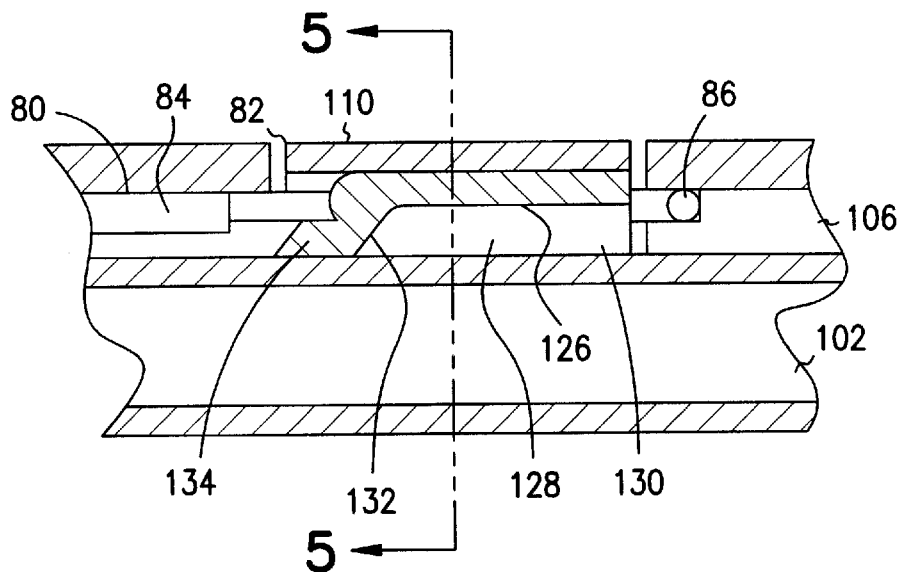
FIG. 4 is a plan view of the assembled inner sleeve and cable conductor at the window.
Figure 5:
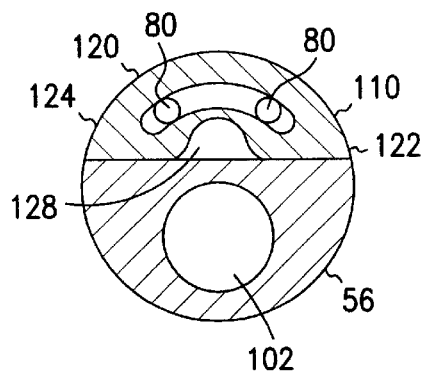
FIG. 5 is a through section of the window of FIG. 4, taken along line 5—5.

Further detail of the window and lumens can be seen in FIGS. 4 and 5. FIG. 4 is a top plan view of the window 108 with crimp sleeve 110, with the cable conductor 80 shown in phantom lines. FIG. 5 is a plan through section of the multilumen lead body.

Once the crimp sleeve 110 has been positioned in the lead body, the proximal sleeve 66 can be slid onto the lead body. The coiled segment 62 is then placed on the lead body with the proximal end extending past the crimp sleeve 110. The coil 62 is then laser welded to the crimp sleeve. The proximal sleeve 66 is brought up over the proximal end of the coil 62 and secured with adhesive, as described above.

Figure 6:
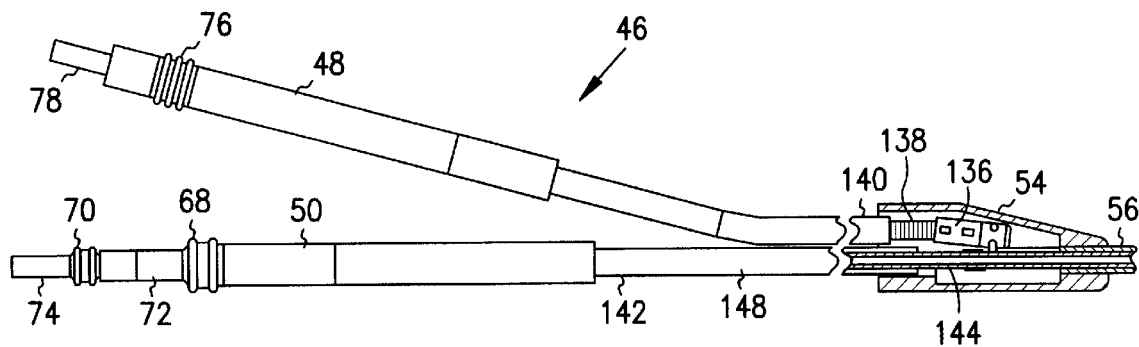
FIG. 6 is a partial through section of the proximal end of the lead.

The proximal end 46 of the lead is shown in FIG. 6, showing a partial through section of a plan view of the distal end 46 of the lead. The boot 54 encloses an assembly connecting the two connectors 48, 50. A crimp connector 136 is connected to a coiled conductor 138 which is electrically and mechanically connected to the pin connector 78 of the high voltage connector 48. The coil conductor 138 passes through an insulating sleeve 140. The low voltage connector 50 has a coaxial lead segment 142. The coil conductor 100, described above in connection with the distal end of the lead, passes co-axially down the lead segment 142, that is, the axis of the coil 100 and the axis of the lead segment 142 coincide. An inner tubing 144 surrounds the coil conductor 100. A return low voltage coil conductor 146 surrounds the inner tubing 144 and is connected proximally at one end to the ring connector 72 and at a distal end 150 to the crimp connector 136. An outer tubing 148 encases the return coil 146.

Figure 7:
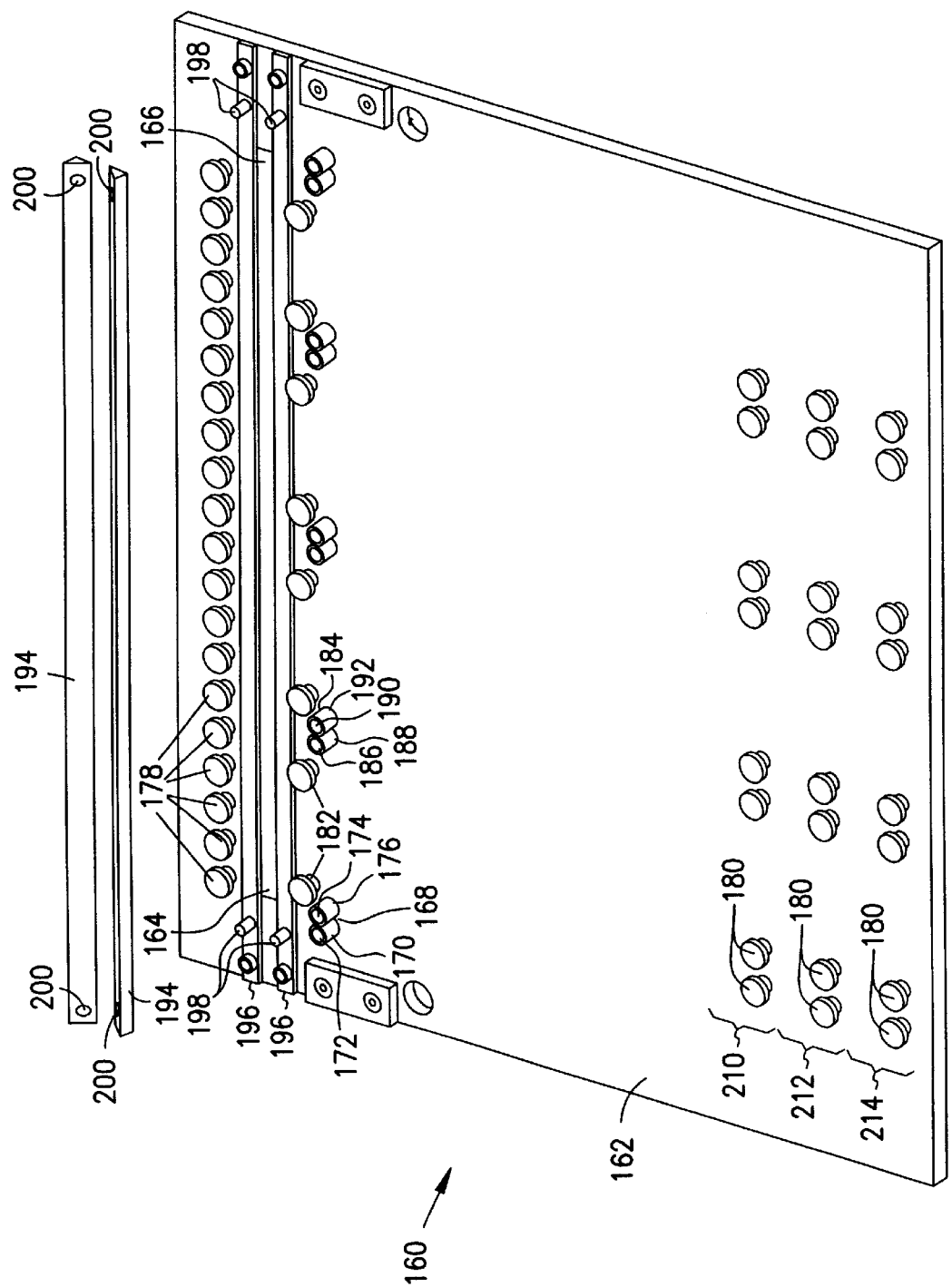
FIG. 7 is a perspective view of an apparatus for stripping insulation from a cable conductor according to the present invention.
Figure 8:
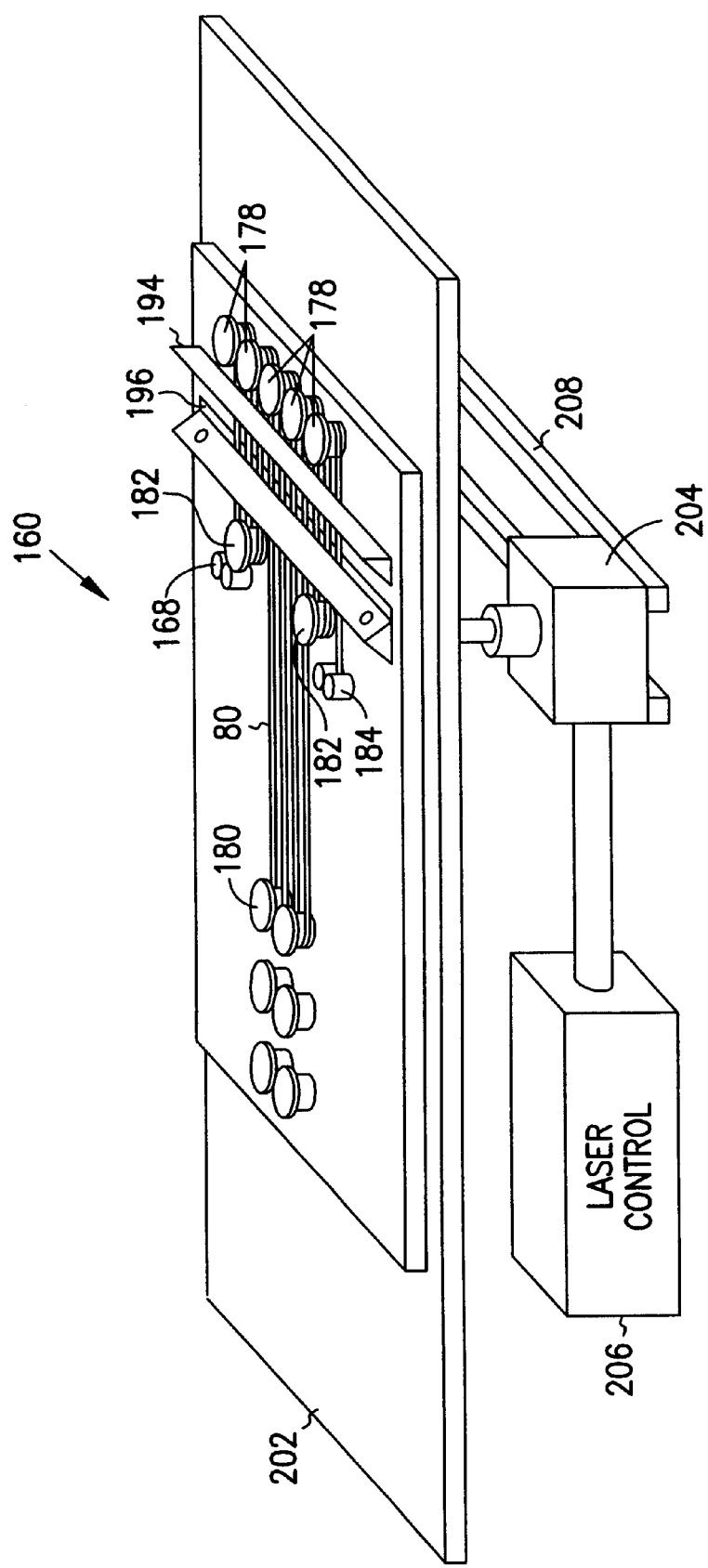
FIG. 8 is a perspective view of the apparatus of FIG. 7 with laser according to our invention.

An apparatus and jig for preparing the cable 80 are illustrated in FIGS. 7 and 8. In FIG. 7 a jig 160 is illustrated in perspective view. The jig 160 comprises a base plate 162 having a linear stripping area 164. The linear stripping area 164 has slot 166 through the plate 162. A laser beam is directed to exposed areas of the conductor 80 to remove insulation at selected areas. The jig 160 is preferably configured so that a plurality of cables 80 can be manufactured at one time. In the illustrated embodiment, four cables could be installed in the jig for installation removal. A single-cable jig is illustrated in FIG. 8. For clarity of explanation, the components for a single cable conductor 80 will be described, but it is to be understood that this could be replicated as often as desired.

With this understanding, it can be seen that jig 160 has a first clasp 168 adjacent the linear stripping area 164. This clasp is used to grasp an end of the conductor 80, as can be seen in FIG. 8. The clasp comprises a first post 170 with an elastomeric sleeve 172 thereon and a second post 174 spaced away from the first post 170. The second post 174 also has an elastomeric sleeve 176. When the end of the conductor 80 is placed between first and second post, the elastomeric sleeves press against the conductor 80 and hold the end in a desired location. On the opposite side of the linear stripping area 164 from the first clasp 168, there is a plurality of primary pins 178. The number of primary pins 178 is a function of the desired of configuration of the conductor 80.

On the same side of the linear stripping area 164 as the first clasp 168, there are secondary pins 180. As will be explained below, sets of secondary pins may be provided to accommodate different lengths of conductors 180. There is also a set of tertiary pins 182, on the same side of the linear stripping area 164 as the secondary pins 180, but placed much closer to the linear stripping area, and preferably adjacent the linear stripping area.

Finally, there is a second clasp 184 for grasping the second end of the conductor 80. Like the first clasp 168, the second clasp 184 comprises a third post 186 enclosed in an elastomeric sleeve 188 and a fourth post 190, also enclosed in an elastomeric sleeve 192. Shield bars 194, 196 are provided which can be placed over the conductor 80, as seen in FIG. 8, and adjacent the linear stripping area. These shield bars serve to block exposure to laser radiation and to conduct heat away from the area being irradiated by laser light. This allows a well defined area on the conductor 80 to be stripped of insulation. Additional lower shield bars 196 are provided below the conductor 80 and serve a similar function to the upper shield bars 194. In our preferred embodiment, the laser radiation is provided from below the base plate 162. In this configuration, the base plate 162 serves an additional shield for the conductor 80. It is easier to remove the vapors resulting from the incineration of the insulation on the conductor 80 which results from exposure to the laser radiation. Index pins 198 are provided for the removable placement of the upper shield bars 194. Each of these pins 198 engages a respective bore 200 in an upper shield bar 194.

The jig 160 is loaded with a conductor 80, as will be more fully described below, and then placed on a work table 202 which has a opening (not shown) at least exposing the linear stripping area 164. A laser 204, mounted below the work table 202, focuses on selected parts of the conductor 80 to burn away the insulation at those selected parts. A suitable laser is manufactured by Lumonics Corporation of Livonia, Mich. The laser 204 is controlled by a laser control apparatus 206. A displacement mechanism 208 is also under the control of the laser control 206. The laser control apparatus 206 both turns the laser beam on and off and causes the displacement mechanism 208 to linearly displace the laser 204 along linear stripping area 164 and to remove insulation at selected locations on the conductor 80. In general, insulation is removed from conductor 80 every second time the conductor passes over the linear stripping area 164.

We will now describe how the conductor 80 is installed in the jig 160. On the end of the conductor 80 is placed in the first clasp 168 and the conductor is taking across the linear stripping area 164, around a first of the primary pins 178, back across the stripping area 164 around a tertiary pin 182, across the stripping area 164, and around a primary pin 178. The conductor 80 is then extended across the stripping area 164 and to a secondary pin 180 which is, as illustrated, a substantial and selected distance away from the linear stripping area. The conductor is then brought back across the stripping are 164, around a third primary pin, back to a secondary pin 180, and then back to a fourth primary pin 178.

It can be seen in FIG. 7 that several sets of secondary pins 180 may be provided. For instance, a first set 210 of secondary pins 180 may be provided at a selected distance from the stripping are 164. A second set 212 and a third set 214 of secondary pins may also be provided. A particular set of secondary pins is used depending on the overall length of the cardiac lead that is being constructed. Cardiac leads are different lengths to accommodate different physiologies in patients. The distance of the secondary pins 180 from the primary pins 178 is related to the length of lead desired.

After passing around the fourth primary pin 178, the conductor again crosses the stripping area 164, passes around the second tertiary pin 182, crosses the stripping area 164, passes around the fifth and final primary pin 178, and is secured in the second clasp 184 after crossing the stripping are 164 for a final time. This pattern may be duplicated as often as desired so that more than one conductor may be manufactured substantially the same time. In the illustrated embodiment of FIG. 7, four conductors could be processed at the same time.

It can be seen by an examination of the apparatus thus described that there is generally one more primary pin than there are both tertiary pins and a set of secondary pins used in any desired set up. Of course, cables could be installed using fewer pins, and the tertiary pins could be omitted. Tertiary pins are used when it is desired to have a cable with two connection locations are desired adjacent the approximate end of the lead.

Those skilled in the art will recognize from the foregoing description that the cable lead of our invention can be used in cardiac leads in other configurations without departing from the teachings of our invention.

While preferred embodiments of the present invention have been shown and described, modifications thereof can be made by one skilled in the art without departing from the spirit or teachings of this invention. The embodiments described herein are exemplary only and are not limiting. Many variations and modifications of this system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method for making an implantable cardiac lead, comprising:

securing a first end of an insulated wire in a first clasp;

passing said wire over a linear stripping area;

wrapping said wire around a first primary pin;

passing said wire over said linear stripping area;

wrapping said wire around a first secondary pin;

passing said wire over said linear stripping area;

wrapping said wire around a second primary pin;

securing a second end of said insulated wire in a second clasp;

removing insulation from said wire at selected locations in said linear stripping area by applying a laser beam to said insulation;

folding said wire at an uninsulated portion thereof;

passing said wire through a lumen in an elongated, flexible lead body;

securing a connector to said wire at a proximal end of said lead body; and securing an electrical contact to said wire at a distal end of said lead body.

2. The method according to claim 1, further comprising:

wrapping said wire around a first tertiary pin, said first tertiary pin being closer to said linear stripping area than said secondary pins;

passing said wire over said linear stripping area;

wrapping said wire around a third primary pin; and passing said wire over said linear stripping area.

3. The method according to claim 2, further comprising:

wrapping said wire around a second tertiary pin, said second tertiary pin being closer to said linear stripping area than said secondary pins;

passing said wire over said linear stripping area;

wrapping said wire around a fourth primary pin; and passing said wire over said linear stripping area.

4. The method according to claim 3, further comprising:

passing said wire over said linear stripping area;

wrapping said wire around a fifth primary pin;

passing said wire over said linear stripping area; and wrapping said wire around a second secondary pin.

5. A method of making an implantable cardiac lead, comprising:

securing a first end of an insulated wire in a first clasp;

passing the insulated wire over a linear stripping area;

wrapping the insulated wire around a first primary pin;

passing the insulated wire over the linear stripping area;

wrapping the insulated wire around a first secondary pin;

passing the insulated wire over the linear stripping area;

wrapping the insulated wire around a second primary pin;

securing a second end of the insulated wire in a second clasp; and removing insulation from the insulated wire at selected locations in the linear stripping area by applying a laser beam to the insulation.

6. The method according to claim 5, further comprising:

wrapping the insulated wire around a first tertiary pin, the first tertiary pin being closer to the linear stripping area than the secondary pins;

passing the insulated wire over the linear stripping area;

wrapping the insulated wire around a third primary pin; and passing the insulated wire over the linear stripping area.

7. The method according to claim 6, further comprising:

wrapping the insulated wire around a second tertiary pin, the second tertiary pin being closer to the linear stripping area than the secondary pins;

passing the insulated wire over the linear stripping area;

wrapping the insulated wire around a fourth primary pin; and passing the insulated wire over the linear stripping area.

8. The method according to claim 7, further comprising:

passing the insulated wire over the linear stripping area;

wrapping the insulated wire around a fifth primary pin;

passing the insulated wire over the linear stripping area; and wrapping the insulated wire around a second secondary pin.

9. A method of preparing insulated wire for assembly in an implantable lead, the method comprising:

securing a first end of an insulated conductor in a first clasp;

exposing selected areas of the insulated conductor to a linear stripping area, wherein exposing the selected areas includes:

passing the insulated conductor from the first clasp over the linear stripping area;

wrapping the insulated conductor around a first primary pin;

passing the insulated conductor over the linear stripping area;

wrapping the insulated conductor around a first secondary pin;

passing the insulated conductor over the linear stripping area;

wrapping the insulated conductor around a second primary pin; and securing a second end of the insulated conductor in a second clasp; and irradiating insulation from the insulated conductor at the selected areas in the linear stripping area by applying laser light to the insulated conductor.

10. The method of claim 9, wherein irradiating insulation from the insulated conductor at the selected areas further comprises linearly displacing the laser along the linear stripping area.

11. The method of claim 9, wherein irradiating insulation from the insulated conductor at the selected areas further comprises, blocking non-selected areas of the insulated conductor from exposure to laser radiation and conducting heat away from the selected areas being irradiated by laser light.

12. The method according to claim 9, wherein exposing selected areas of the conductor to a linear stripping area further comprises:

wrapping the conductor around a first tertiary pin, the first tertiary pin being closer to the linear striping area than the secondary pins;

passing the conductor over the linear stripping area;

wrapping the conductor around a third primary pin; and passing the conductor over the linear stripping area.

13. The method according to claim 12, wherein exposing selected areas of the insulated conductor to a linear stripping area further comprises:

wrapping the conductor around a second tertiary pin, the second tertiary pin being closer to the linear stripping area than the secondary pins;

passing the conductor over the linear stripping area;

wrapping the conductor around a fourth primary pin; and passing the conductor over the linear stripping area.

14. The method according to claim 13, wherein exposing selected areas of the insulated conductor to a linear stripping area further comprises:

passing the conductor over the linear stripping area;

wrapping the conductor around a fifth primary pin;

passing the conductor over the linear stripping area; and wrapping the conductor around a second secondary pin.

* * * * *